US012757256B2

(12) United States Patent
Lee et al.

(10) Patent No.: US 12,757,256 B2
(45) Date of Patent: Oct. 6, 2026

(54) METHOD AND DEVICE FOR RANDOM ACCESS IN WIRELESS COMMUNICATION SYSTEM

(71) Applicant: LG ELECTRONICS INC., Seoul (KR)

(72) Inventors: Youngdae Lee, Seoul (KR); Jaehyung Kim, Seoul (KR); Suckchel Yang, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 288 days.

(21) Appl. No.: 18/294,102

(22) PCT Filed: Aug. 5, 2022

(86) PCT No.: PCT/KR2022/011615
§ 371 (c)(1),
(2) Date: Jan. 31, 2024

(87) PCT Pub. No.: WO2023/014141
PCT Pub. Date: Feb. 9, 2023

(65) Prior Publication Data
US 2024/0340973 A1 Oct. 10, 2024

(30) Foreign Application Priority Data
Aug. 5, 2021 (KR) ........................ 10-2021-0103460

(51) Int. Cl.
*H04W 74/0836* (2024.01)
*H04W 74/00* (2009.01)

(52) U.S. Cl.
CPC ..... *H04W 74/0836* (2024.01); *H04W 74/004* (2013.01)

(58) Field of Classification Search
CPC ........................ H04W 74/004; H04W 74/0836
(Continued)

(56) References Cited

U.S. PATENT DOCUMENTS

| | | | | |
|---|---|---|---|---|
| 2016/0150570 | A1 | 5/2016 | Wang et al. | |
| 2021/0168649 | A1 * | 6/2021 | Turtinen | H04W 72/20 |
| 2023/0397198 | A1 * | 12/2023 | Turtinen | H04B 17/328 |

FOREIGN PATENT DOCUMENTS

KR 1020210063393 6/2021

OTHER PUBLICATIONS

European Patent Office Application Serial No. 22853516.7, Search Report dated Oct. 11, 2024, 11 pages.
(Continued)

*Primary Examiner* — Peter G Solinsky
(74) *Attorney, Agent, or Firm* — LEE, HONG, DEGERMAN, KANG & WAIMEY

(57) ABSTRACT

Disclosed are a method and device for random access in a wireless communication system. A method by which a terminal performs random access in a wireless communication system according to one embodiment disclosed herein comprises the steps of: receiving, from a network, configuration information related to a first preamble group for a first-type feature; transmitting a first message to the network on the basis of a preamble selected from the first preamble group; and transmitting, to the network, a second message including a logical channel identifier (LCID) associated with a second-type feature, wherein the terminal may support both the first-type feature and the second-type feature.

8 Claims, 12 Drawing Sheets

(58) Field of Classification Search
USPC .......................................................... 370/329
See application file for complete search history.

(56) References Cited

OTHER PUBLICATIONS

3rd Generation Partnership Project (3GPP), "Technical Specification Group Radio Access Network; Study on support of reduced capability NR devices (Release 17)," 3GPP TR 38.875 V17.0.0, Mar. 2021, 135 pages.
PCT International Application No. PCT/KR2022/011615, International Search Report dated Nov. 23, 2022, 2 pages.
Moderator (NTT Docomo Inc.), "FL summary #5 on RAN1 aspects for RAN2-led features for RedCap," 3GPP TSG- RAN WG1 Meeting #105-e, R1-2106328, May 2021, 59 pages.
Qualcomm Incorporated, "Access and camping restriction for RedCap UEs," 3GPP TSG-RAN WG2 Meeting #114-e, R2-2104775, May 2021, 6 pages.
Moderator (Intel Corporation), "Moderator summary #4 on RedCap—Others," 3GPP TSG RAN WG1 Meeting #103-e, R1-2009735, Nov. 2020, 72 pages.

* cited by examiner

FIG. 12

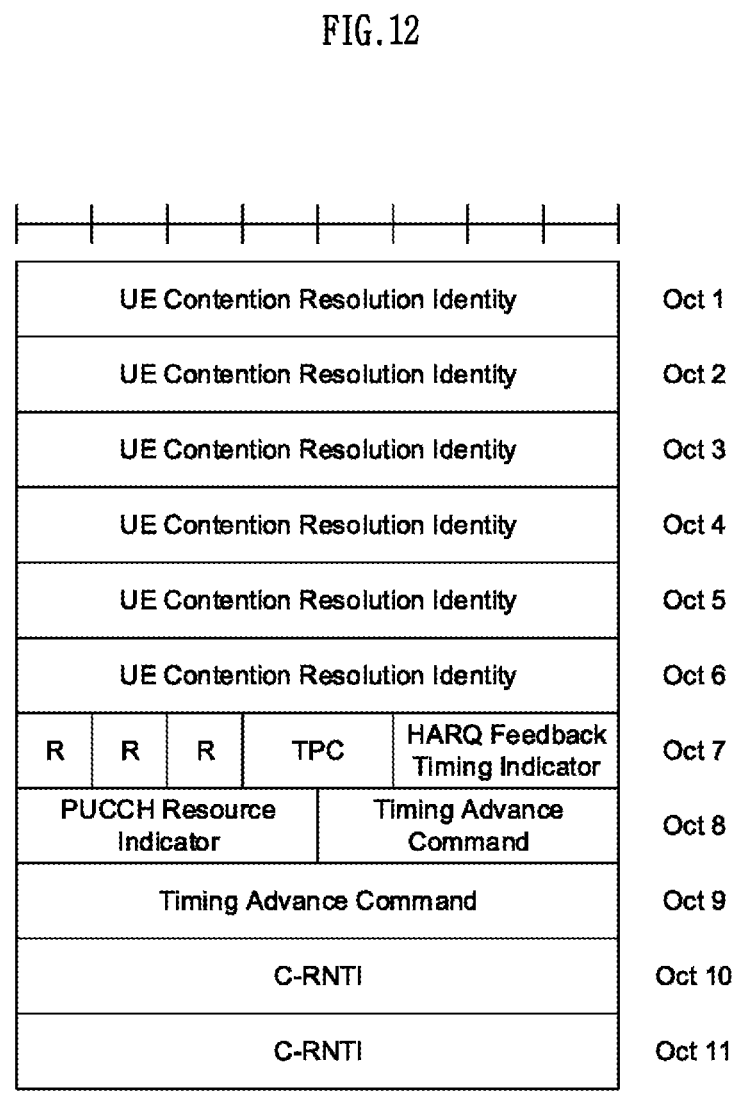

<table>
<tr><td colspan="8">UE Contention Resolution Identity</td><td>Oct 1</td></tr>
<tr><td colspan="8">UE Contention Resolution Identity</td><td>Oct 2</td></tr>
<tr><td colspan="8">UE Contention Resolution Identity</td><td>Oct 3</td></tr>
<tr><td colspan="8">UE Contention Resolution Identity</td><td>Oct 4</td></tr>
<tr><td colspan="8">UE Contention Resolution Identity</td><td>Oct 5</td></tr>
<tr><td colspan="8">UE Contention Resolution Identity</td><td>Oct 6</td></tr>
<tr><td>R</td><td>R</td><td>R</td><td colspan="2">TPC</td><td colspan="3">HARQ Feedback Timing Indicator</td><td>Oct 7</td></tr>
<tr><td colspan="4">PUCCH Resource Indicator</td><td colspan="4">Timing Advance Command</td><td>Oct 8</td></tr>
<tr><td colspan="8">Timing Advance Command</td><td>Oct 9</td></tr>
<tr><td colspan="8">C-RNTI</td><td>Oct 10</td></tr>
<tr><td colspan="8">C-RNTI</td><td>Oct 11</td></tr>
</table>

METHOD AND DEVICE FOR RANDOM ACCESS IN WIRELESS COMMUNICATION SYSTEM

CROSS-REFERENCE TO RELATED APPLICATION(S)

This application is the National Stage filing under 35 U.S.C. 371 of International Application No. PCT/KR2022/011615, filed on Aug. 5, 2022, which claims the benefit of earlier filing date and right of priority to Korean Application No. 10-2021-0103460, filed on Aug. 5, 2021, the contents of which are all incorporated by reference herein in their entirety.

TECHNICAL FIELD

The present disclosure relates to a wireless communication system, and in more detail, relates to a method and a device for performing random access in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and a device for performing or supporting random access in a wireless communication system.

An additional technical problem of the present disclosure is to provide a method and a device for performing or supporting various types of random access of a terminal in a wireless communication system.

An additional technical problem of the present disclosure is to provide a method and a device for indicating a type of a terminal in a random access process in a wireless communication system.

An additional technical problem of the present disclosure is to provide a method and a device for indicating a type of a terminal based on a random access type in a wireless communication system.

The technical objects to be achieved by the present disclosure are not limited to the above-described technical objects, and other technical objects which are not described herein will be clearly understood by those skilled in the pertinent art from the following description.

A method for performing random access by a terminal in a wireless communication system according to an aspect of the present disclosure includes receiving from a network configuration information related to a first preamble group for a first type feature: transmitting a first message to the network based on a preamble selected from the first preamble group; and transmitting to the network a second message including a logical channel identifier (LCID) related to a second type feature, and the terminal may support both the first type feature and the second type feature.

A method for responding to a random access procedure of a terminal by a base station in a wireless communication system according to an additional aspect of the present disclosure includes transmitting to at least one terminal configuration information related to a first preamble group for a first type feature; receiving a first message based on a preamble selected from the first preamble group from a specific terminal of the at least one terminal: and receiving from the specific terminal a second message including a logical channel identifier (LCID) related to a second type feature, and the specific terminal may support both the first type feature and the second type feature.

According to the present disclosure, a method and a device for performing or supporting random access in a wireless communication system may be provided.

According to the present disclosure, a method and a device for performing or supporting various types of random access of a terminal in a wireless communication system may be provided.

According to the present disclosure, a method and a device for indicating a type of a terminal in a random access process in a wireless communication system may be provided.

According to the present disclosure, a method and a device for indicating a type of a terminal based on a random access type in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 12 is a diagram showing an example of a success RAR MAC CE format including a PRI to which the present disclosure may be applied.

DETAILED DESCRIPTION

Figure 1:
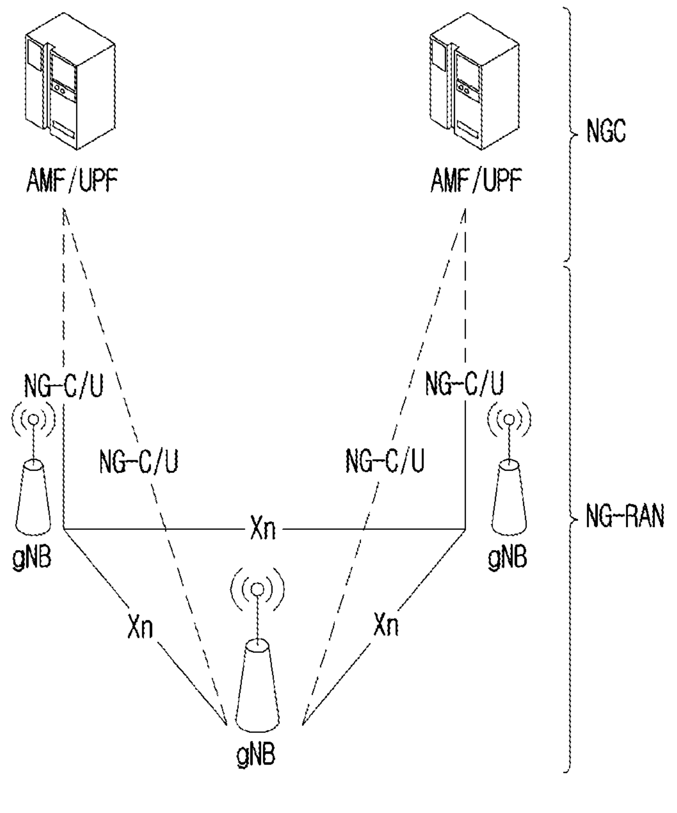
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
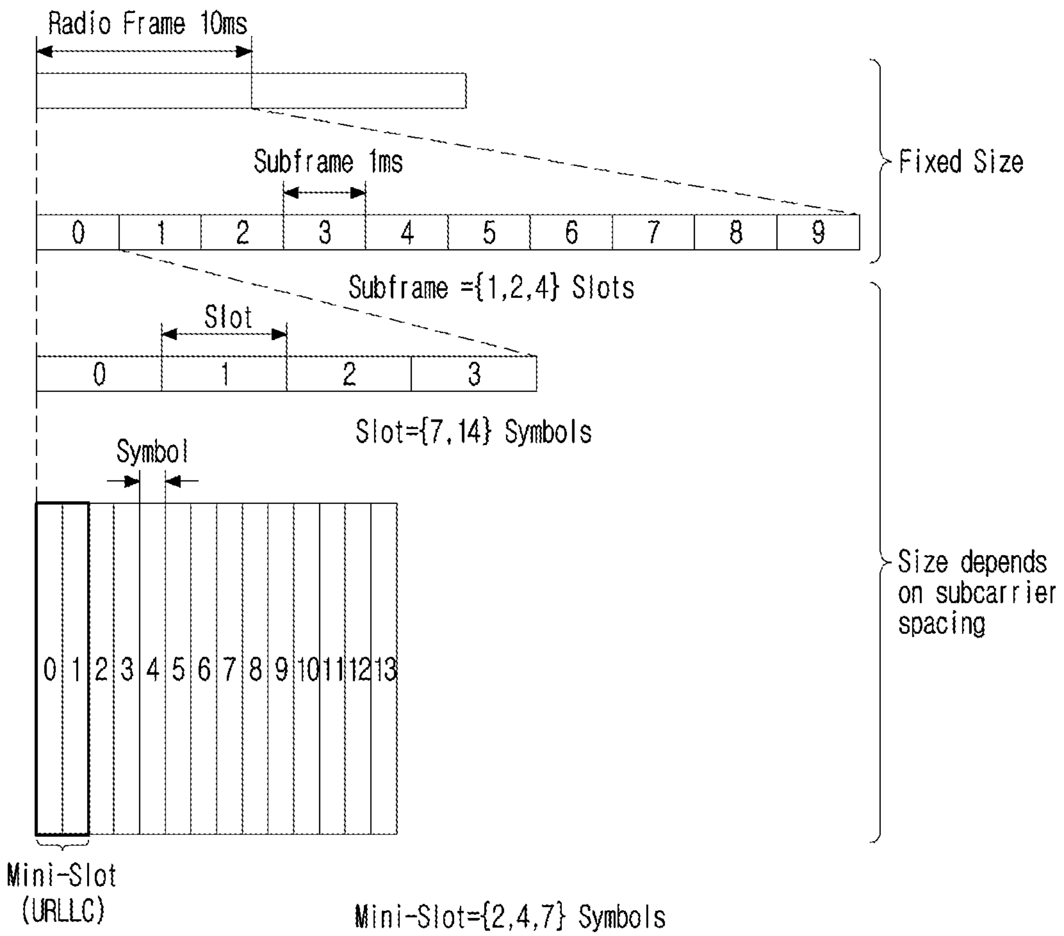
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
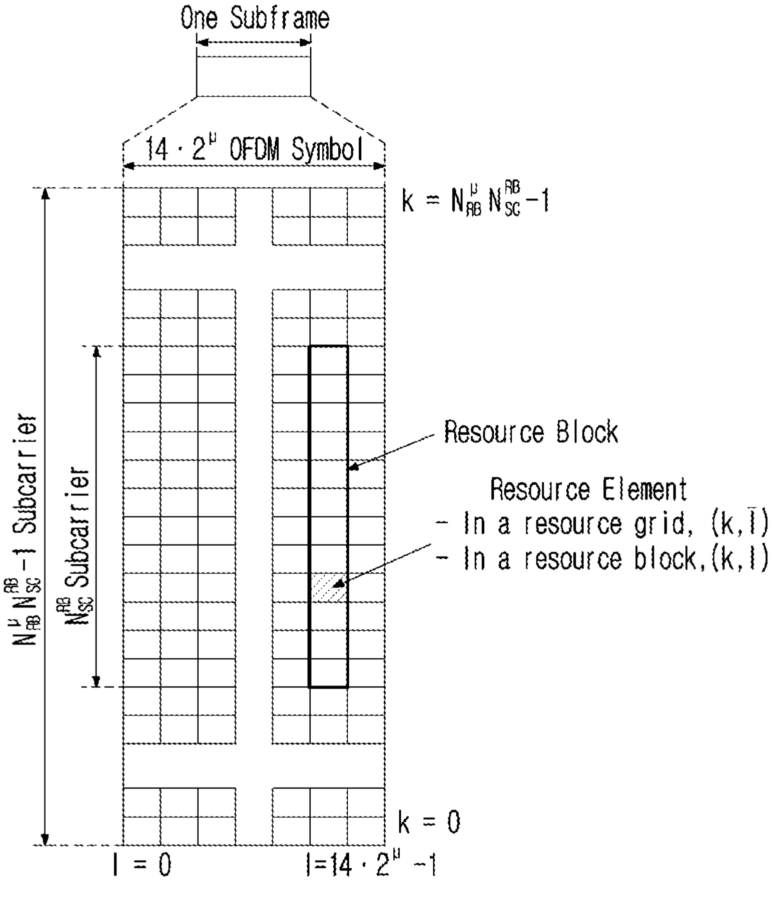
FIG. 3 illustrates a resource grid in a wireless communication system to which the present disclosure may be applied.

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied. In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0 \ldots, N_{RB}^{\mu} N_{sc}^{RB}-1$ is an index in a frequency domain and $l'=0 \ldots, 2^{\mu} N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(P)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
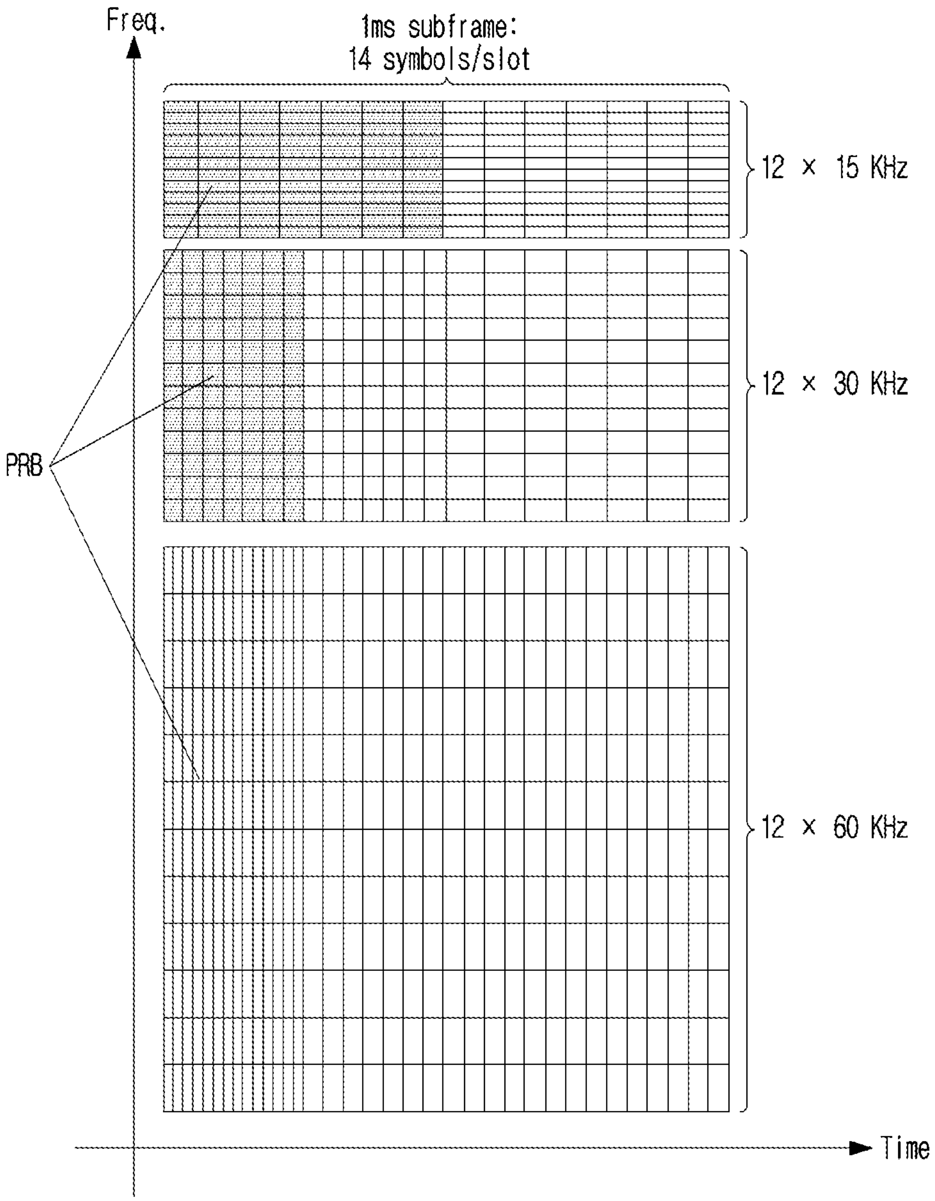
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
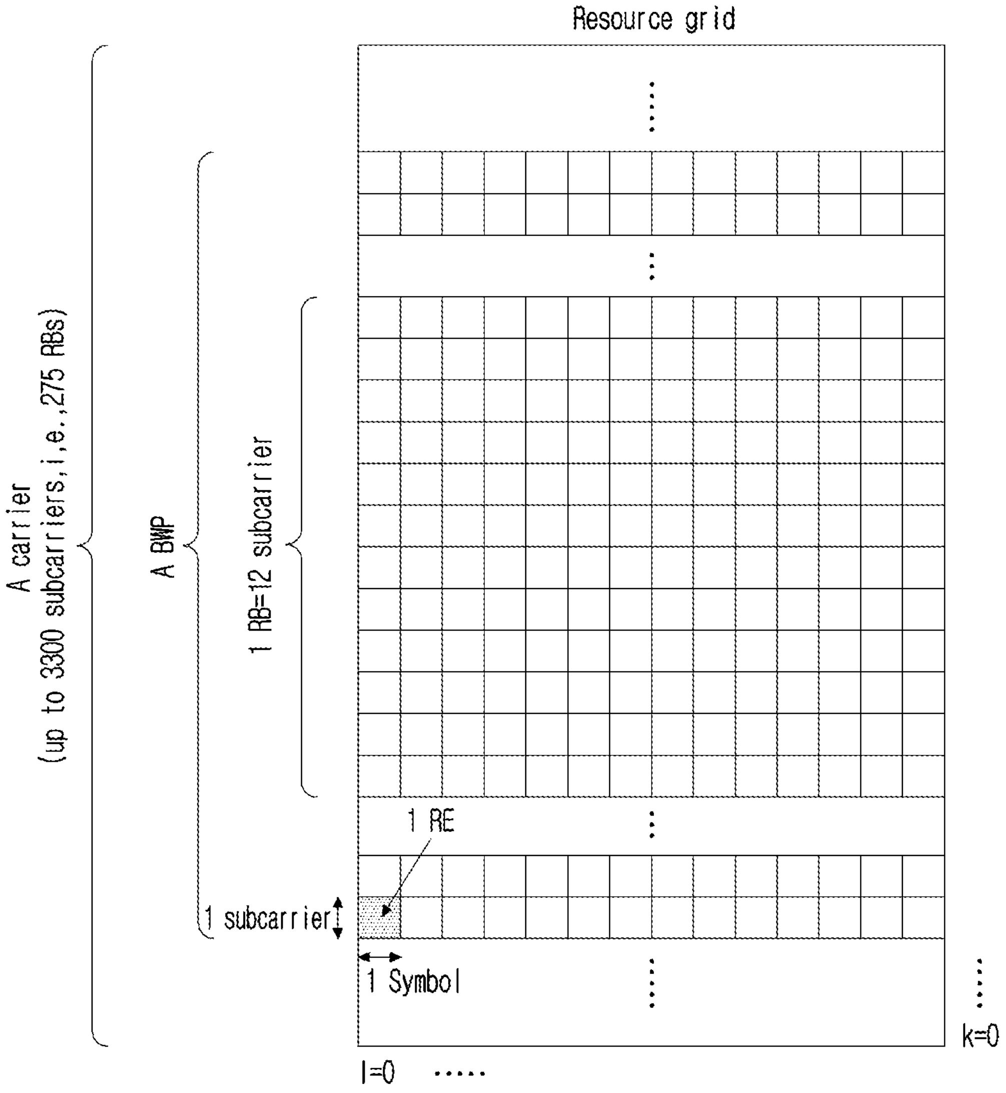
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
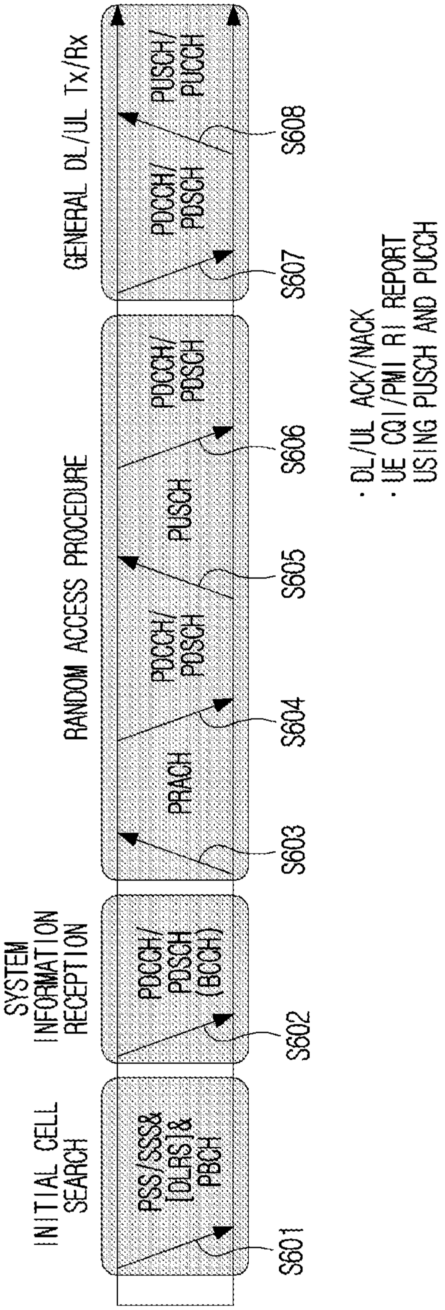
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation and Coding Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted. DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Random Access Procedure

A random access process may be used for a variety of purposes and in a variety of situations. For example, a random access process may be used in network initial access, handover or an UE-triggered uplink data transmission procedure, etc. A terminal may acquire uplink synchronization and uplink transmission resources through a random access process. A random access process is divided into a contention-based process and a non-contention-based process (or dedicated process). Here, in describing the present disclosure, a random access process may be used interchangeably with a random access channel (RACH) procedure.

Figure 7:
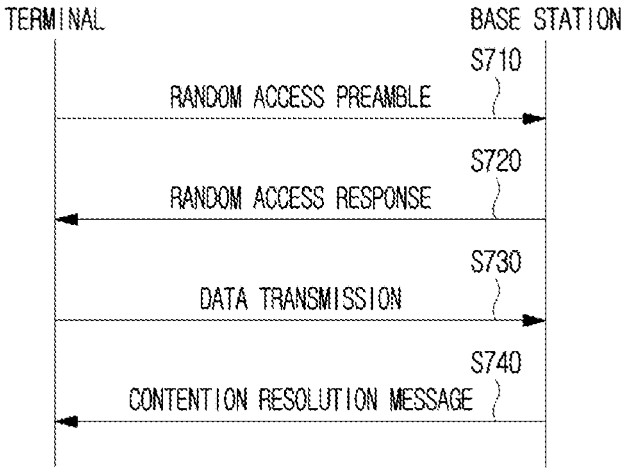
FIG. 7 shows an example of a contention-based random access process in a wireless system to which the present disclosure may be applied.

FIG. 7 shows an example of a contention-based random access process in a wireless system to which the present disclosure may be applied.

In reference to FIG. 7, a terminal may receive information on random access from a base station through system information (e.g., a master information block (MIB) or system information block 1 (SIB1), etc.). Afterwards, when random access is required, a terminal may transmit a random access (or random access) preamble (i.e., message 1 (msg1)) to a base station S710. For example, a terminal may transmit a random access preamble to a base station through a physical random access channel (PRACH).

Here, a terminal may select an optimal SSB or Channel Status Information-Reference Signal (CSI-RS) and determine a RO and/or a preamble index group associated with a selected SSB or CSI-RS. In an initial access process, a terminal may select an optimal SSB and a reception beam corresponding thereto among a plurality of SSBs corresponding to multi-beam sweeping of a base station. Meanwhile, in a RRC connection state after initial access, a terminal may select or change a transmission beam and/or a reception beam through a CSI measurement and reporting process based on a CSI-RS from a base station. When a random access preamble is received from a terminal, a base station may transmit a random access (or random access) response (RAR) message (i.e., message 2 (msg2)) to a terminal S720. In other words a terminal may monitor RAR reception for a predetermined time period (e.g., a RAR window) after transmitting a preamble.

Specifically, scheduling information on a random access response message may be CRC-masked (or scrambled) with a random access-radio network temporary identifier (RA-RNTI) and transmitted on a L1/L2 control channel (e.g., a L1 control channel may include a PDCCH, etc. and a L2 control channel may include a common control channel (CCCH), etc.). A PDCCH masked with a RA-RNTI may be transmitted only through a common search space.

When receiving a scheduling signal masked with a RA-RNTI, a terminal may receive a random access response message from a PDSCH indicated by the scheduling information. Afterwards, a terminal may check whether a random access response message includes random access response information indicated to a terminal itself. A process of checking whether random access response information indicated to a terminal itself exists may include a process of checking whether a random access preamble ID (RAPID) corresponding to a random access preamble transmitted by a terminal is present in a random access response message. Random access response information may include timing offset information for UL synchronization (e.g., a timing advance command, TAC), uplink scheduling information (e.g., uplink grant) and terminal temporary identification information (e.g., a temporary cell-RNTI, a Temporary C-RNTI), etc.

When a terminal does not successfully receive RAR during a RAR window, it may retransmit a preamble by applying power ramping, etc.

When receiving random access response information, a terminal may transmit uplink-shared channel (UL-SCH) data (i.e., message (msg) 3) to a base station through a PUSCH based on uplink scheduling information S730. After receiving UL-SCH data, a base station may transmit a contention resolution message (i.e., message (msg) 4) to a terminal S740. For example, when Msg3 transmission is performed, a terminal may start a contention resolution timer (a CR timer) and perform PDCCH monitoring based on a C-RNTI for Msg4 reception. When Msg4 is received while a CR timer is running, a terminal may determine that contention resolution was successfully implemented.

A random access process like an example in FIG. 7 may be referred to as a type-1 (or 4-step) random access process. Type-2 (or 2-step) random access may include Step A (or MsgA transmission) in which a terminal transmits a random access preamble (or a PRACH) and an uplink message (e.g., a PUSCH) to a base station and Step B (or MsgB reception) in which a terminal receives a random access response, a contention resolution message, etc. from a base station. Here, a terminal may monitor a PDCCH or DCI CRC-scrambled by a corresponding MsgB-RNTI during a MsgB window after MsgA transmission.

Figure 8:
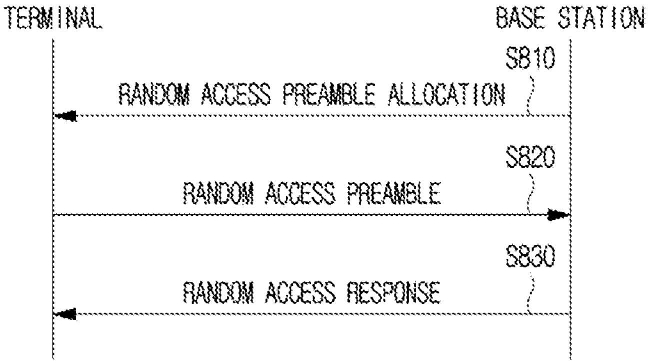
FIG. 8 shows an example of a non-contention-based random access process in a wireless system to which the present disclosure may be applied.

FIG. 8 shows an example of a non-contention-based random access process in a wireless system to which the present disclosure may be applied.

A non-contention-based random access process may be used in a handover process or may be performed when separately requested by a command from a base station. A basic procedure of a non-contention-based random access procedure is the same as a contention-based random access procedure.

In reference to FIG. 8, a terminal may be allocated a dedicated random access (or random access) preamble from a base station S810. Information indicating a dedicated random access preamble (e.g., a preamble index) may be included in a RRC message (e.g., a handover command) or may be received through a PDCCH order.

After initiating a random access procedure, a terminal may transmit a dedicated random access (or random access) preamble to a base station S820. Afterwards, a random access procedure may be ended when a terminal receives a random access (or random access) response from a base station S830. A random access procedure on a secondary cell (SCell) may be initiated only by a PDCCH order.

A PRACH format or a preamble format for transmitting a PRACH preamble in a NR system may include a format configured with a sequence with a length of 839 (e.g., may be referred to as a long PRACH format) and a format configured with a sequence with a length of 139 (e.g., may be referred to as a short PRACH format).

For example, in FR1, SCS of a short PRACH format may be defined as 15 kHz or 30 KHz. For example, a PRACH may be transmitted on 139 middle subcarriers (or tones) among 12 RBs (i.e., 144 REs) (e.g., excluding 2 subcarriers on a low RE index side and 3 subcarriers on a high RE index side or excluding 3 subcarriers on a low RE index side and 2 subcarriers on a high RE index side).

A short PRACH format may be defined as in Table 6. In Table 6, LRA corresponds to a length of a sequence, $\Delta f^{RA}$ corresponds to subcarrier spacing, $N_u$ corresponds to a length related to a sequence repetition (i.e., a length excluding a CP), $N_{CP}{}^{RA}$ corresponds to a CP length and it is K=Ts/Tc=64. As in Table 3, a value of μ may have a value of 0, 1, 2, or 3 or when 480 kHz, 960 kHz, . . . . SCS is supported, it may have a value of 4, 5, . . . . Table 6 is just an example, and a variety of other PRACH formats may be defined.

TABLE 6

| Format | $L_{RA}$ | $\Delta f^{RA}$ | $N_u$ | $N_{CP}{}^{RA}$ |
|---|---|---|---|---|
| A1 | 139 | $15 \cdot 2^{\mu}$ kHz | $2 \cdot 2048K \cdot 2^{-\mu}$ | $288K \cdot 2^{-\mu}$ |
| A2 | 139 | $15 \cdot 2^{\mu}$ kHz | $4 \cdot 2048K \cdot 2^{-\mu}$ | $576K \cdot 2^{-\mu}$ |
| A3 | 139 | $15 \cdot 2^{\mu}$ kHz | $6 \cdot 2048K \cdot 2^{-\mu}$ | $864K \cdot 2^{-\mu}$ |
| B1 | 139 | $15 \cdot 2^{\mu}$ kHz | $2 \cdot 2048K \cdot 2^{-\mu}$ | $216K \cdot 2^{-\mu}$ |
| B2 | 139 | $15 \cdot 2^{\mu}$ kHz | $4 \cdot 2048K \cdot 2^{-\mu}$ | $360K \cdot 2^{-\mu}$ |
| B3 | 139 | $15 \cdot 2^{\mu}$ kHz | $6 \cdot 2048K \cdot 2^{-\mu}$ | $504K \cdot 2^{-\mu}$ |
| B4 | 139 | $15 \cdot 2^{\mu}$ kHz | $12 \cdot 2048K \cdot 2^{-\mu}$ | $936K \cdot 2^{-\mu}$ |
| C0 | 139 | $15 \cdot 2^{\mu}$ kHz | $2048K \cdot 2^{-\mu}$ | $1240K \cdot 2^{-\mu}$ |
| C2 | 139 | $15 \cdot 2^{\mu}$ kHz | $4 \cdot 2048K \cdot 2^{-\mu}$ | $2048K \cdot 2^{-\mu}$ |

Figure 9:
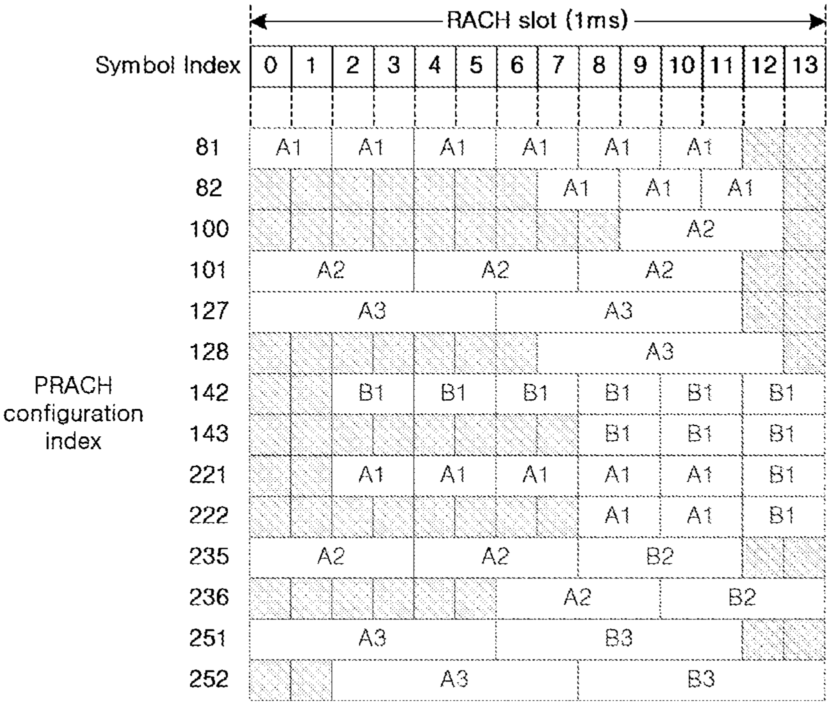
FIG. 9 is a diagram showing examples of a RO in one RACH slot to which the present disclosure may be applied.

FIG. 9 is a diagram showing examples of a RO in one RACH slot to which the present disclosure may be applied.

A terminal may configure/indicate which PRACH format is used at a specific timing, whether transmission is performed for a specific duration, the number of ROs (RACH occasions or PRACH occasions) in a corresponding slot, etc. based on higher layer (e.g., RRC) signaling from a base station, a MAC CE and/or DCI. For example, as a variety of PRACH configurations are defined/provided in advance to a terminal and an index is allocated per PRACH configuration, a corresponding PRACH configuration may be configured/indicated to a terminal through a specific index. Table 7 illustratively shows a set of parameters defined per PRACH configuration index.

TABLE 7

| PRACH Configuration Index | Preamble format | $n_{SFN}$ mod x = y: x | y | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| 81 | A1 | 1 | 0 | 4, 9 | 0 | 1 | 6 | 2 |
| 82 | A1 | 1 | 0 | 7, 9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4, 9 | 0 | 1 | 2 | 6 |
| 128 | A3 | 1 | 0 | 7, 9 | 7 | 1 | 1 | 6 |
| 142 | B1 | 1 | 0 | 4, 9 | 2 | 1 | 6 | 2 |
| 143 | B1 | 1 | 0 | 7, 9 | 8 | 1 | 3 | 2 |
| 221 | A1/B1 | 1 | 0 | 4, 9 | 2 | 1 | 6 | 2 |
| 222 | A1/B1 | 1 | 0 | 7, 9 | 8 | 1 | 3 | 2 |
| 235 | A2/B2 | 1 | 0 | 4, 9 | 0 | 1 | 3 | 4 |
| 236 | A2/B2 | 1 | 0 | 7, 9 | 6 | 1 | 2 | 4 |
| 251 | A3/B3 | 1 | 0 | 4, 9 | 0 | 1 | 2 | 6 |
| 252 | A3/B3 | 1 | 0 | 7, 9 | 2 | 1 | 2 | 6 |

In an example of Table 7, information on how many ROs are defined in a corresponding RACH slot per preamble format (i.e., $N_t^{RA,slot}$) and how many OFDM symbols are occupied by each PRACH preamble for a corresponding preamble format (i.e., $N_{dur}^{RA}$), etc. may be provided. In addition, since a start symbol of a first RO is indicated, information on at which timing in a corresponding RACH slot a RO starts may be also provided. For PRACH configuration indexes of examples in Table 7, a configuration of a RO in a RACH slot may be shown as in FIG. 7.

Terminal Type-based Random Access Operation

In an enhanced wireless communication system, a new type of terminal supporting a limited or reduced capability (RedCap) including a size of a small transmission or reception bandwidth or the number of transmission or reception antennas, etc. may be supported. In addition, in an enhanced wireless communication system, a terminal that supports a coverage enhancement (CE) capability to support a wider coverage than a cell coverage supported by a general terminal may be supported.

In describing the present disclosure, a terminal supporting a limited capability may be referred to as a R terminal/R-UE/RedCap terminal and a terminal supporting a CE capability may be referred to as a CE terminal/CE UE.

Here, a R terminal may support a CE capability (i.e., CE UE), but is not limited thereto, and may not support a CE capability (i.e., non-CE). A general terminal may also support a CE capability. In addition, a CE terminal may be a general terminal or a R terminal.

R-UE or CE UE supports a limited or different terminal capability compared to other terminals. Accordingly, a base station needs to identify a type of a terminal or a feature supported by a terminal in a RACH process. In a currently defined random access procedure, there is no way for a base station to initially identify R-UE or CE UE. For example, when a terminal performs a two-step RACH, if it may first perform MSGA transmission indicating a terminal type (e.g., PRACH preamble transmission and PUSCH transmission) and receives MSGB including a MAC CE including information on a fallback RAR, it may transmit MSG3 by switching to a 4-step RACH. In this case, it is not clear whether a terminal must report a terminal type again after switching to a 4-step RACH.

The present disclosure describes various examples in which a terminal provides/transmits to a base station information indicating/identifying a type of a feature (or a type of a terminal) or a capability supported by a terminal in a random access process. For example, a terminal may support one feature or a combination of a plurality of features. In other words, a terminal may support at least one of a plurality of features. A feature that may be supported by a terminal may include RedCap, CE, etc.

In the present disclosure, as a terminal that is CE UE is a terminal that requires a Msg3 PUSCH repetition, a terminal that is CE UE may be replaced by the following term. In other words, CE may be replaced by a Msg3 repetition.

For example, a general terminal that is CE UE may be replaced by a general terminal that requires a Msg3 PUSCH repetition. In addition, a general UE that is non-CE may be replaced by general UE that does not require a Msg3 PUSCH repetition. In addition, a R terminal that is CE UE may be replaced by a R terminal that requires a Msg3 PUSCH repetition. In addition, a R terminal that is non-CE may be replaced by a R terminal that does not require a msg3 PUSCH repetition.

For example, it may be divided into CE UE that does not require a Msg3 PUSCH repetition although it is CE UE in terms of a terminal capability and CE UE that require a Msg3 PUSCH repetition. In this case, in the present disclosure, CE UE may mean both CE UE that does not require a Msg3 PUSCH repetition and CE UE that requires a Msg3 PUSCH repetition or may mean only CE UE that requires a Msg3 PUSCH repetition.

Figure 10:
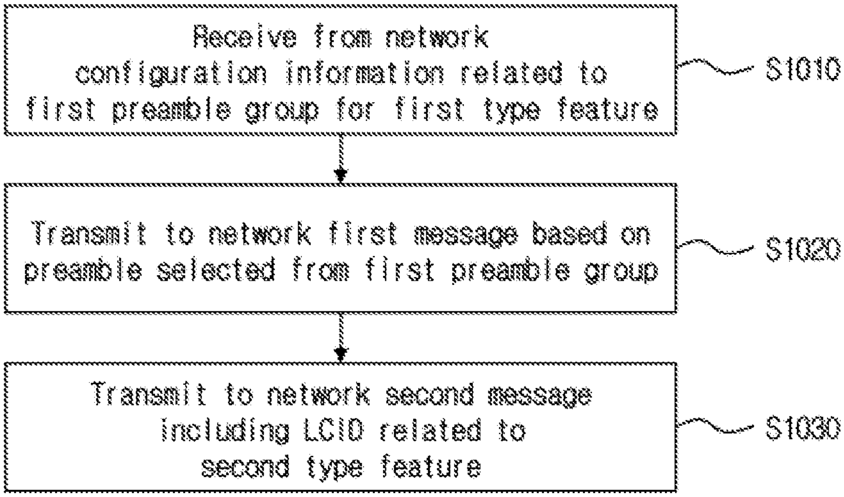
FIG. 10 is a diagram for describing a method of performing random access of a terminal according to an embodiment of the present disclosure.

FIG. 10 is a diagram for describing a method of performing random access of a terminal according to an embodiment of the present disclosure.

In S1010, a terminal may receive configuration information related to a first preamble group for a first type feature from a network.

For example, a terminal may support both a type 1 feature and a type 2 feature. For example, a first type feature may correspond to a Msg3 repetition for coverage enhancement (CE) and a second type feature may correspond to a reduced capability (RedCap). It is just an example, and a terminal of the present disclosure may support a combination of at least one of a plurality of features.

A term of preamble group may be replaced by a term such as a random access resource set, a preamble set, etc. A first preamble group for a first type feature may be configured and additionally or alternatively, a second preamble group for a second type feature may be configured. In other words, the present disclosure assumes that a terminal supports a plurality of features, but a preamble group is configured only for feature(s) corresponding to part (or a subset) of them.

In S1020, a terminal may transmit a first message to a network based on a preamble selected from a first preamble group.

A terminal may inform a network that a terminal supports a first type feature by selecting a first preamble group corresponding to a first type feature (i.e., a preamble group corresponding to one feature among a plurality of features supported by a terminal).

For example, a first message may correspond to MsgA in a 2-step random access procedure (e.g., a preamble transmitted at a PRACH occasion among MsgA) and may correspond to Msg1 in a 4-step random access procedure (i.e., a PRACH preamble).

A terminal may select a preamble within a selected preamble group. As described above, selection of a preamble may be based on a predetermined criterion (e.g., SSB/CSI-RS based, optimal beam, etc.) or may be selected randomly.

If a 4-step random access procedure is performed after reaching the maximum number of transmissions of MsgA in a 2-step random access procedure, a terminal may select a first preamble group corresponding to a first type feature (and, select a preamble from a selected preamble group). Alternatively, a terminal may select a preamble group in a different way according to various examples described later.

In S1030, a terminal may transmit a second message including a LCID related to a second type feature to a network.

A second message may correspond to PUSCH transmission in a random access process. For example, for a second message, PUSCH transmission may be included in MsgA in a 2-step random access procedure or may correspond to Msg3 transmitted based on a random access response (RAR). For example, a RAR may correspond to Msg2 in a 4-step random access procedure or may correspond to a fallback RAR in a 2-step random access procedure.

In a random access process, Msg3 (or a PUSCH included in MsgA in a 2-step random access process) may correspond to a message transmitted on an uplink-shared channel (UL-SCH) including a common control channel (CCCH) service data unit (SDU) or a C-RNTI MAC CE. A C-RNTI MAC CE or a CCCH SDU may be provided from a higher layer and as part of a random access process, it may be associated with contention resolution identification information of a terminal. Here, an UL-SCH corresponds to a transport channel and a CCCH corresponds to a logical channel.

A MAC protocol data unit (PDU) included in a second message (or a PUSCH) may include at least one MAC subPDU. Each MAC subPDU may be configured with only a MAC sub-header, may be configured with a MAC sub-header and a MAC SDU, may be configured with a MAC subheader and a MAC CE or may be configured with a MAC sub-header and padding. A MAC sub-header may include logical channel identification information (LCID).

LCID included in a second message may be related to a second type feature. For example, LCID may be related to a common control channel (CCCH) for a second type feature.

In the present disclosure, in order to indicate a plurality of features supported by a terminal, some features may be indicated through selection of a related preamble group and other features may be indicated through related LCID. But, an example of the present disclosure is not limited thereto, and a terminal may inform a network of a plurality of features it supports according to a variety of indication methods described later.

Figure 11:
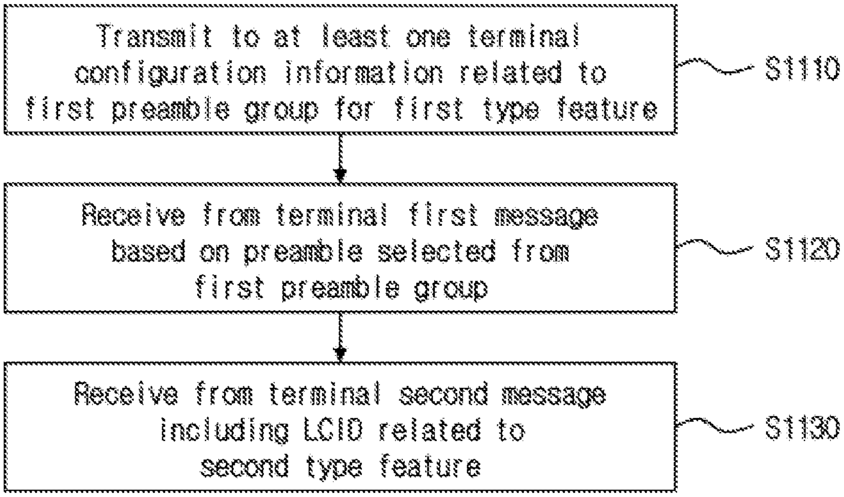
FIG. 11 is a diagram for describing a random access response method of a base station according to an embodiment of the present disclosure.

FIG. 11 is a diagram for describing a random access response method of a base station according to an embodiment of the present disclosure.

In S1110, a base station may transmit configuration information related to a first preamble group for a first type feature to at least one terminal.

In S1120, a base station may receive a first message based on a preamble selected from a first preamble group from a specific terminal.

In S1130, a base station may receive a second message including LCID related to a second type feature from a specific terminal.

In an example referring to FIG. 11, contents related to a first type feature and a second type feature of a terminal, a preamble group, a first message, a second message and LCID are the same as a description for an example in FIG. 10, so an overlapping description is omitted.

Hereinafter, specific examples of the present disclosure are described.

When UE having a specific capability or a limited capability performs a 2-step random access procedure for reasons such as initial access, handover, Beam Failure Recovery (BFR), RRC Re-establishment, etc., UE's specific capability or limited capability may be identified to complete a random access procedure according to a corresponding capability. For example, when MSGA in a 2-step random access procedure indicates a specific terminal type (or a type of a feature supported by a terminal) and receives a fallback RAR MAC CE to switch to a 4-step random access procedure, a terminal type (or a type of a feature supported by a terminal) may be reported again in a 4-step random access procedure according to a base station's indication/configuration.

Examples of the present disclosure may be applied to all UEs or may be applied only to a specific type of UE having a specific capability. For example, a method of the present disclosure may be used to identify a R terminal and a CE terminal. In the present disclosure, a base station may configure a different UL BWP for a different terminal type to identify a general terminal that is CE UE, a general terminal that is non-CE UE, a R terminal that is CE UE and a R terminal that is non-CE UE or may allocate different PRACH preambles or PRACH resources of the same BWP. In addition, if necessary, a base station may be configured to indicate an additional or specific terminal type through MSG3.

A base station needs to identify a terminal type when a terminal performs a 2-step random access procedure in a scenario such as initial access, handover, Beam Failure Recovery (BFR), RRC Re-establishment, RRC resume, etc.

In this scenario, a terminal may perform a RACH in a specific UL BWP. For example, in initial access, it may be an initial UL BWP and in handover, it may be a first active UL BWP in a target cell and in BFR, it may be an UE active BWP or an initial UL BWP or a default UL BWP in a serving cell and in RRC re-establishment, it may be an initial UL BWP in a cell selected by a terminal.

A base station may or may not support a specific terminal type (e.g., a general terminal, a R terminal, a CE terminal, etc.) in a specific cell. In other words, a base station may support all multiple terminal types or only some terminal types in a specific cell. For example, in a specific cell, a terminal type combination according to one of cases mentioned below may be supported.

A base station may support a separate PRACH partitioning set for MSGA transmission of a specific terminal type. In this case, a separate PRACH partitioning set may refer to one, part or all of separate PRACH resources for MSGA, separate PRACH preambles or separate RACH occasions (RO). In addition, a PRACH partitioning set may correspond to a preamble group described by referring to FIGS. 10 and 11. A base station may transmit configuration information for a separate PRACH partitioning set (e.g., related to terminal type identification/indication) for a 2-step RACH to terminals through SIB1 or a specific SIB for a specific terminal type.

If a 2-step RACH and a 4-step RACH are configured together, a base station may additionally configure PRACH partitioning set(s) for a 4-step RACH and PRACH partitioning set(s) for a 2-step RACH per uplink BWP. For example, when one cell supports all of a general terminal that is CE UE, a general terminal that is non-CE UE, a R terminal that is CE UE and a R terminal that is non-CE UE with the same UL BWP, PRACH partitioning set(s) for one 4-step RACH and PRACH partitioning set(s) for one 2-step RACH may be configured for each UL BWP per different terminal type. Accordingly, when 4 terminal types are supported, a total of 8 PRACH partitioning set(s) may be configured per UL BWP in one cell. If a separate UL BWP is configured for a R terminal, a total of 8 PRACH partitioning set(s) may be configured for 2 UL BWPs and if 4 terminal types are supported, a total of 4 PRACH partitioning set(s) may be configured per UL BWP in one cell. As such, a base station may identify a terminal type based on an UL BWP, based on a PRACH partitioning set or based on a combination of an UL BWP and a PRACH partitioning set.

For a 2-step RACH, a terminal type may be indicated through PUSCH transmission of MSGA. For example, a terminal may indicate whether a terminal transmitting MSGA is a R terminal or a general terminal to a base station through a PUSCH of MSGA. Additionally or alternatively, a terminal may also indicate whether a terminal transmitting MSGA is a CE terminal or a non-CE terminal to a base station through a PUSCH of MSGA. For example, when it is configured by a base station with a SIB, etc., a terminal may indicate a specific type of terminal transmitting MSGA through a PUSCH of MSGA. For example, this information (e.g., information corresponding to a terminal type indication or indicating a terminal type) may be included in a header or a sub-header of a MAC PDU transmitted by a PUSCH of MSGA.

As a specific example, a LCID field may be included in a sub-header of a MSGA MAC PDU and a specific value of a LCID field may indicate a type of a terminal or may be related to a type of a terminal. For example, a type of a terminal that may be indicated by LCID (or related to LCID) may be one of three terminal types: a general terminal that is CE UE, a R terminal that is CE UE or a R terminal that is non-CE or may be a type of a R terminal.

If it is configured to indicate one of three terminal types, but MSGA received by a base station does not indicate one of three, a base station may identify a terminal that transmitted MSGA as a general terminal that is non-CE.

If it is configured to indicate that it is a R terminal, but MSGA received by a base station does not indicate that it is a R terminal, a base station may identify a terminal that transmitted MSGA as a general terminal.

Accordingly, it is possible to identify whether it is a general terminal that is CE UE or a general terminal that is non-CE UE according to a PRACH partitioning set used in PRACH transmission of MSGA.

For CE UE, a terminal may transmit a PRACH of MSGA by using a PRACH partitioning set for CE UE and repeatedly transmit a PUSCH of MSGA according to a base station's configuration. Next, for non-CE UE, a terminal may transmit a PRACH of MSGA by using a PRACH partitioning set for non-CE UE and transmit a PUSCH of MSGA according to a base station's configuration.

For example, a R terminal may transmit a PUSCH through a PUSCH occasion for a R terminal according to a base station's configuration and a general terminal may transmit a PUSCH through a PUSCH occasion for a general terminal. If a separate PUSCH occasion for a R terminal is not configured, a R terminal may also transmit a PUSCH through the same PUSCH occasion as a general terminal.

For example, a CE terminal may transmit a PUSCH through a PUSCH occasion for a CE terminal according to a base station's configuration and a non-CE terminal may transmit a PUSCH through a PUSCH occasion for a non-CE terminal. If a separate PUSCH occasion for a CE terminal is not configured, a CE terminal may also transmit a PUSCH through the same PUSCH occasion as a non-CE terminal.

For example, a R terminal that is a CE terminal may transmit a PUSCH through a PUSCH occasion dedicated to a CE terminal (or a CE terminal and a R terminal) according to a base station's configuration and another terminal may transmit a PUSCH through a different PUSCH occasion. If a PUSCH occasion dedicated to a specific terminal type is not configured, a R terminal that is a CE terminal may also transmit a PUSCH through the same PUSCH occasion as another terminal.

EMBODIMENT 1

This embodiment relates to a method in which whether a CE feature is supported is identified/indicated based on a preamble group and whether a R feature is supported is identified/indicated based on PUSCH transmission. For example, both a general terminal that is CE UE and a R terminal that is CE UE may transmit MSGA or MSG1 by selecting a preamble from the same specific PRACH partitioning set. For example, a preamble group (or a random access resource set) may be related to whether a terminal supports a CE (or Msg3 repetition) feature and whether a terminal supports another feature (e.g., a R terminal) may be indicated through PUSCH transmission (MSGA or MSG3) (e.g., LCID).

For example, a base station may configure a specific PRACH partitioning set dedicated to CE. As such, when a base station provides a CE-dedicated PRACH partitioning set without a separate PRACH partitioning set for a R terminal, both a general terminal that is a CE terminal and a R terminal that is a CE terminal may transmit a PRACH by using a CE-dedicated PRACH partitioning set. In other words, when CE is supported, both a regular terminal and a R terminal may transmit MSGA through a PRACH preamble and a PRACH resource of a CE-dedicated PRACH partitioning set. In addition, a R terminal may additionally indicate that it is a R terminal through PUSCH transmission of MSGA. For example, when a base station requests a SIB1 configuration, a R terminal may additionally indicate that it is a R terminal through PUSCH transmission of MSGA. For example, a LCID field may be included in a sub-header of a MSGA MAC PDU and a specific value of a LCID field may indicate that it is a R terminal.

If a separate PUSCH occasion for a R terminal is configured, i.e., if different PUSCH occasions are configured for a general terminal and a R terminal, a R terminal may transmit MSGA with a PUSCH occasion for a R terminal. In this case, when it is configured with SIB1, a R terminal may perform transmission by deactivating frequency hopping in PUSCH transmission. In this case, a base station may attempt to receive both a PUSCH occasion for a R terminal and a PUSCH occasion for a general terminal in order to figure out whether a R terminal that is CE UE transmits MSGA or whether a general terminal that is CE UE transmits MSGA.

If a separate PUSCH occasion for a R terminal is not configured, i.e., if the same PUSCH occasion is configured for a general terminal and a R terminal, a R terminal may transmit MSGA with the same PUSCH occasion as a general terminal.

A general terminal that is CE UE may transmit MSGA by using a CE-dedicated PRACH partitioning set. In addition, a general terminal that is a CE terminal may indicate that it is not a R terminal through PUSCH transmission (e.g., through LCID).

A general terminal that is non-CE UE may transmit MSGA by using another PRACH partitioning set, not a CE-dedicated one. In addition, a general terminal that is a non-CE terminal may indicate that it is not a R terminal through PUSCH transmission (e.g., through LCID).

EMBODIMENT 2

This embodiment relates to a method in which whether a R feature is supported is identified/indicated based on a preamble group and whether a CE feature is supported is identified/indicated based on PUSCH transmission. For example, both a R terminal that is CE UE and a R terminal that is non-CE UE may transmit MSGA or MSG1 by selecting a preamble from the same specific PRACH partitioning set. For example, a preamble group (or a random access resource set) may be related to whether a terminal supports a R feature and whether a terminal supports another feature (e.g., CE or Msg3 repetition) may be indicated through PUSCH transmission (MSGA or MSG3) (e.g., LCID).

For example, a base station may configure the specific PRACH partitioning set dedicated to CE. As such, when a base station provides a CE-dedicated PRACH partitioning set without a separate PRACH partitioning set for a R terminal, a R terminal may transmit a PRACH of MSGA by using a CE-dedicated PRACH partitioning set regardless of CE. In other words, all R terminals may transmit MSGA through a PRACH preamble and a PRACH resource of a CE-dedicated PRACH partitioning set. In this case, a terminal type may be additionally indicated through PUSCH transmission of MSGA. For example, this indication may be included in a header or a sub-header of a MAC PDU transmitted with a PUSCH of MSGA. Specifically, a LCID field may be included in a sub-header of a MSGA MAC PDU and a specific value of a LCID field may indicate one of three terminal types (e.g., a general terminal that is CE UE, a R terminal that is CE UE, a R terminal that is non-CE) or may indicate that it is a R terminal or may indicate that it is a CE terminal/a non-CE terminal.

If it is configured to indicate one of three terminal types, but MSGA received by a base station does not indicate one of three types, a base station may identify a terminal that transmitted MSGA as a general terminal that is non-CE.

If it is configured to indicate that it is a R terminal, but MSGA received by a base station does not indicate that it is a R terminal, a base station may identify a terminal that transmitted MSGA as a general terminal. Accordingly, according to a PRACH partitioning set used in PRACH transmission of MSGA, whether it is a general terminal that is CE UE or a general terminal that is non-CE UE is identified. In other words, a R terminal selects a preamble group for CE regardless of whether a CE feature is supported, but a general terminal may select a preamble group for CE only when a CE feature is supported.

If a separate PUSCH occasion for a R terminal is configured, i.e., if different PUSCH occasions are configured for a general terminal and a R terminal, a R terminal may transmit MSGA with a PUSCH occasion for a R terminal. In this case, when it is configured with SIB1, a R terminal may perform transmission by deactivating frequency hopping in PUSCH transmission. In this case, a base station may attempt to receive both a PUSCH occasion for a R terminal and a PUSCH occasion for a general terminal in order to figure out whether a R terminal that is CE UE transmits MSGA or whether a general terminal that is CE UE transmits MSGA.

If a separate PUSCH occasion for a R terminal is not configured, i.e., if the same PUSCH occasion is configured for a general terminal and a R terminal, a R terminal may transmit MSGA with the same PUSCH occasion as a general terminal.

If different PUSCH occasions are configured for a CE terminal and a non-CE terminal, a non-CE terminal may transmit MSGA with a PUSCH occasion for non-CE and a CE terminal may transmit MSGA with a PUSCH occasion for CE.

If different PUSCH occasions are configured for a CE terminal and a non-CE terminal, a non-CE terminal may transmit MSGA with a PUSCH occasion that does not require PUSCH repetition and a CE terminal may transmit MSGA with a PUSCH occasion that requires PUSCH repetition for CE.

In this case, a base station may attempt to receive both a PUSCH occasion for CE and a PUSCH occasion for non-CE in order to figure out whether a CE UE terminal transmits MSGA or whether a non-CE UE terminal transmits MSGA.

Here, a PUSCH occasion for CE may mean a PUSCH repetition and a PUSCH occasion for non-CE may mean that a PUSCH repetition is not applied.

If a separate PUSCH occasion for non-CE is not configured, a R terminal that is non-CE may transmit MSGA with a PUSCH occasion for CE. When a PUSCH occasion for CE means a PUSCH repetition, a R terminal that is non-CE may skip the remaining PUSCH repetitions after transmitting a MSGA PUSCH one time without performing a PUSCH repetition even at a PUSCH occasion for CE.

A general terminal that is CE UE may also transmit a PRACH by using a CE-dedicated PRACH partitioning set. In addition, a general terminal that is a CE terminal may indicate that it is not a R terminal through PUSCH transmission (e.g., through LCID).

A general terminal that is non-CE UE may transmit MSGA by using another PRACH partitioning set, not a CE-dedicated one. In addition, a general terminal that is a non-CE terminal may indicate that it is not a R terminal through PUSCH transmission (e.g., through LCID).

EMBODIMENT 3

This embodiment relates to a PUCCH resource allocation method through a Success RAR MAC CE.

A base station may separately configure a common PUCCH resource set (e.g., PUCCH resource set 1) to a general terminal and a separate common PUCCH resource set (e.g., PUCCH resource set 15) to a R terminal or a CE terminal. Accordingly, a R terminal or a CE terminal may select separate PUCCH resource set 15 to transmit a PUCCH. These terminals may transmit a PUCCH by using a PUCCH resource set of SIB1 until receiving a terminal-dedicated PUCCH resource set after initial access.

A base station may configure additional N PUCCH resource sets other than 16 PUCCH resource sets for a R terminal or a CE terminal. Accordingly, a R terminal or a CE terminal may select one PUCCH resource set of N+15 or N PUCCH resource sets through one of various configuration methods described later.

If a separate PUCCH resource set configuration for a R terminal or a CE terminal is not included in SIB1, a terminal may select a PUCCH resource by using the same PUCCH resource set as a general terminal according to SIB1 information.

Before a terminal-dedicated PUCCH resource set is received, different types of terminals may use the same PUCCH resource set according to a specific configuration method. In this case, a base station may configure different types of terminals to apply a different PUCCH resource within the same PUCCH resource set. For example, when a R terminal and a CE terminal are configured to use the same PUCCH resource set, a general terminal and a R terminal or a CE terminal are configured to use the same PUCCH resource set or all types of terminals are configured to use the same PUCCH resource set, a different PUCCH resource may be selected per terminal type within the same PUCCH resource set.

FIG. 12 is a diagram showing an example of a success RAR MAC CE format including a PRI to which the present disclosure may be applied.

For a 2-step RACH, a terminal may transmit MSGA and a base station may transmit MSGB in response thereto. Here, a SuccessRAR MAC CE corresponding to MSGB may include a PUCCH resource indicator (PRI) which will be used by a general terminal, a R terminal or a CE terminal as in FIG. 12. When a terminal type is indicated through MSGA, a R terminal may select a PUCCH resource indicated by a PUCCH resource indicator (PRI) of a SuccessRAR MAC CE among PUCCH resources of a PUCCH resource set for a R terminal and a CE terminal may select a PUCCH resource indicated by a PUCCH resource indicator (PRI) of a SuccessRAR MAC CE among PUCCH resources of a PUCCH resource set for a CE terminal. A R terminal that is CE UE may select a PUCCH resource indicated by a PUCCH resource indicator (PRI) of a SuccessRAR MAC CE among PUCCH resources of a dedicated PUCCH resource set for a R terminal that is CE UE or a PUCCH resource set for CE UE or a R terminal. A terminal may use a selected PUCCH resource to transmit HARQ-ACK for MSGB including a SuccessRAR MAC CE.

EMBODIMENT 4

This embodiment relates to a method for identifying a 4-step RACH when receiving a fallback RAR MAC CE.

Figure 13:
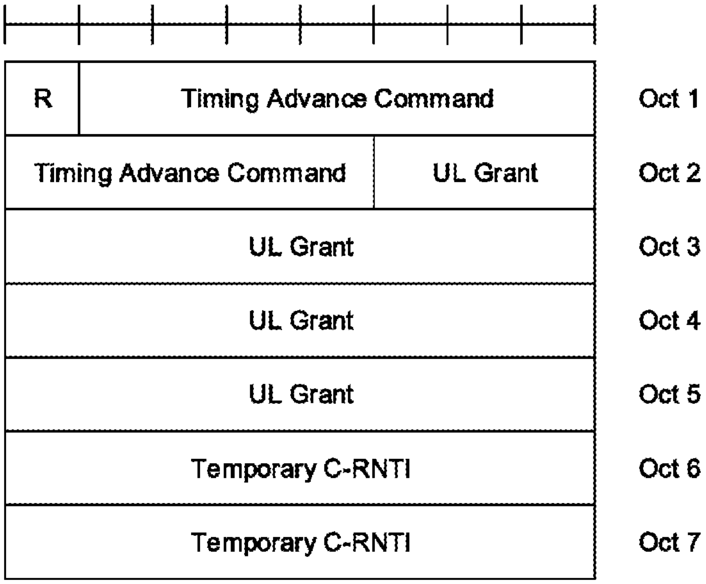
FIG. 13 is a diagram showing an example of a fallback RAR MAC CE format to which the present disclosure may be applied.

FIG. 13 is a diagram showing an example of a fallback RAR MAC CE format to which the present disclosure may be applied.

For a 2-step RACH, a terminal may transmit MSGA and a base station may transmit MSGB in response thereto. When MSGA is not successfully received, a base station may transmit a FallbackRAR MAC CE to MSGB. For example, when PRACH transmission of MSGA is successfully received, but PUSCH transmission of MSGA is not successfully received, a base station may request MSG3 transmission of a 4-step RACH by transmitting the same FallbackRAR MAC CE as in FIG. 13.

In this case, a case may occur in which a terminal does not clearly indicate a terminal type through PRACH transmission of MSGA and accordingly, a base station may request a terminal type from a corresponding terminal by transmitting a FallbackRAR MAC CE. For example, a base station that received MSGA may request a terminal type through an UL Grant field, a reserved (R) field or a newly added field of a FallbackRAR MAC CE.

It may also request only a certain type of terminal to report a terminal type to a FallbackRAR MAC CE. Accordingly, when a R terminal or a CE terminal receives a terminal type request through a specific field of a FallbackRAR MAC CE (or receives a terminal type request for a R terminal or a terminal type request for a CE terminal), a corresponding terminal, not a general terminal, may switch to a 4-step RACH. A corresponding terminal that switched from a 2-step RACH to a 4-step RACH may transmit a MSG3 PUSCH of a 4-step RACH by using UL grant information of a FallbackRAR MAC CE. If it is a general terminal or is not a corresponding type of terminal, a terminal may ignore a corresponding FallbackRAR MAC CE or may fall back to a 4-step RACH according to a received FallbackRAR MAC CE, but ignore a terminal type request indication.

When a terminal type is indicated according to a terminal type request after falling back to a 4-step RACH, a LCID field may be included in a sub-header of a MSG3 MAC PDU and a specific value of a LCID field may indicate one of three terminal types (e.g., a general terminal that is CE UE, a R terminal that is CE UE, a R terminal that is non-CE), may indicate that it is a R terminal or may indicate that it is a CE terminal/a non-CE terminal.

Here, although a FallbackRAR MAC CE requests a terminal type, a general terminal or a general terminal that is non-CE may not report a terminal type through a MSG3 MAC PDU.

When a FallbackRAR MAC CE does not request a terminal type, a R terminal or a CE terminal may not indicate a terminal type with MSG3. Alternatively, when a FallbackRAR MAC CE does not request a terminal type, a R terminal or a CE terminal may not report a terminal type through a MSG3 MAC PDU. Alternatively, when all terminal types are indicated with a PRACH of MSGA, a R terminal or a CE terminal may not report a terminal type through a MSG3 MAC PDU.

Although a FallbackRAR MAC CE does not request a terminal type, if a terminal type is indicated with a PUSCH of MSGA, a R terminal or a CE terminal may report a terminal type again through a MSG3 MAC PDU. Here, a LCID field may be included in a sub-header of a MSG3 MAC PDU and a specific value of a LCID field may indicate one of three terminal types (e.g., a general terminal that is CE UE, a R terminal that is CE UE, a R terminal that is non-CE), may indicate that it is a R terminal or may indicate that it is a CE terminal/a non-CE terminal.

When a method in which a FallbackRAR MAC CE requests a terminal type is not supported, regardless of whether a terminal type was reported through MSGA, if there is a SIB1 configuration, a terminal that received a FallbackRAR MAC CE in response to MSGA may report a terminal type again through MSG3. For example, a LCID field may be included in a sub-header of a MSG3 MAC PDU and a specific value of a LCID field may indicate one of three terminal types (e.g., a general terminal that is CE UE, a R terminal that is CE UE, a R terminal that is non-CE), may indicate that it is a R terminal or may indicate that it is a CE terminal/a non-CE terminal according to a SIB1 configuration.

Additionally or alternatively, a base station may separately configure/designate a terminal type indication method in a 2-step RACH and a terminal type indication method in a 4-step RACH through SIB1. For example, a 2-step RACH may be configured to indicate a terminal type with a MSGA PUSCH and a 4-step RACH may be configured to indicate a terminal type through a MSG1 PRACH resource or preamble. Alternatively, a 2-step RACH may be configured not to indicate a terminal type with a MSGA PUSCH and a 4-step RACH may be configured to indicate a terminal type through a MSG1 PRACH resource or preamble.

For example, when a R terminal or a CE terminal switches to a 4-step RACH due to FallbackRAR MAC CE reception, regardless of a terminal type indication method configured in a 2-step RACH and a terminal type indication method for a 4-step RACH, a terminal type may be indicated through a MSG3 PUSCH according to UL grant information of a FallbackRAR MAC CE. When contention resolution for MSG3 PUSCH transmission is not successfully received after fallback, a terminal performs transmission again from MSG1 of a 4-step RACH, and in this case, according to a terminal type indication method for a 4-step RACH, a corresponding R terminal or CE terminal may indicate a terminal type through MSG1 or MSG3 or may not indicate a terminal type.

When fallback is performed from a 2-step RACH to a 4-step RACH, MSG3 may be transmitted to UL BWP2 different from UL BWP1 that transmitted MSGA. For example, when a FallbackRAR MAC CE indicates BWP ID=2 of another UL BWP for MSG3 transmission or when UL BWP1 for MSGA transmission is different from UL BWP2 for MSG3 transmission for a corresponding terminal type, a R terminal or a CE terminal may transmit MSG3 of a 4-step RACH by changing from UL BWP1 to UL BWP2.

A FallbackRAR MAC CE may indicate whether to activate or deactivate a specific operation when transmitting a MSG3 PUSCH. For example, an UL grant field of a FallbackRAR MAC CE, a new field or a specific field may indicate whether to activate or deactivate frequency hopping when transmitting a MSG3 PUSCH. In this case, a specific type of terminal (e.g., a R terminal) may activate or deactivate frequency hopping when transmitting a MSG3 PUSCH according to a corresponding indication.

EMBODIMENT 5

This embodiment relates to a terminal type identification/indication method when a 4-step RACH is performed due to reaching the maximum number of transmissions of MSGA of a 2-step RACH (e.g., msgA-TransMax).

When a 2-step RACH is used, a terminal may transmit MSGA and a base station may transmit MSGB in response thereto. In this case, when a base station does not successfully receive MSGA, a terminal may not receive MSGB. Accordingly, a terminal may retransmit MSGA. When MSGA retransmission is performed as many times as (or over) the number of msgA-TransMaxs configured by a base station, a terminal may switch to a 4-step RACH by transmitting MSG1 instead of MSGA.

A base station may separately configure/designate a terminal type indication method in a 2-step RACH and a terminal type indication method in a 4-step RACH through SIB1. For example, a 2-step RACH may be configured to indicate a terminal type with a MSGA PUSCH and a 4-step RACH may be configured to indicate a terminal type through a MSG1 PRACH resource or preamble. Alternatively, for example, a 2-step RACH may be configured not to indicate a terminal type with a MSGA PUSCH and a 4-step RACH may be configured to indicate a terminal type through a MSG1 PRACH resource or a preamble. In this case, when a R terminal or a CE terminal switches to a 4-step RACH due to reaching msgA-TransMax, regardless of a terminal type indication method configured in a 2-step RACH, a terminal type may or may not be indicated with MSG1 or MSG3 by switching to a terminal type indication method for a 4-step RACH.

For example, when it is switched from a 2-step RACH to a 4-step RACH due to reaching msgA-TransMax, MSG3 may be transmitted to UL BWP2 different from UL BWP1 that transmitted MSGA. For example, when UL BWP1 for MSGA transmission is different from UL BWP2 for MSG3 transmission for a corresponding terminal type, a R terminal or a CE terminal may change from UL BWP1 to UL BWP2 to transmit MSG3 of a 4-step RACH. When a 2-step RACH and a 4-step RACH are configured to use a different PRACH partitioning set of the same UL BWP for a specific terminal type or when it is switched from a 2-step RACH to a 4-step RACH due to reaching msgA-TransMax, a specific type of terminal may transmit MSG1 by switching to a PRACH partitioning set for a 4-step RACH of the same UL BWP. In this case, a base station may be configured to apply a different msgA-TransMax value to a different terminal type. For example, a msgA-TransMax value of a general terminal and a R terminal or CE terminal-dedicated msgA-TransMax value may be configured separately.

Through SIB1, a base station may indicate whether to activate or deactivate a specific operation when a specific type of terminal switches to a 4-step RACH. For example, when a R terminal switches to a 4-step RACH, whether to activate or deactivate frequency hopping may be indicated for MSG3 PUSCH transmission, etc. In this case, a specific type of terminal (e.g., a R terminal) may activate or deactivate frequency hopping when transmitting a MSG3 PUSCH according to a corresponding indication.

General Device to which the Present Disclosure may be Applied

Figure 14:
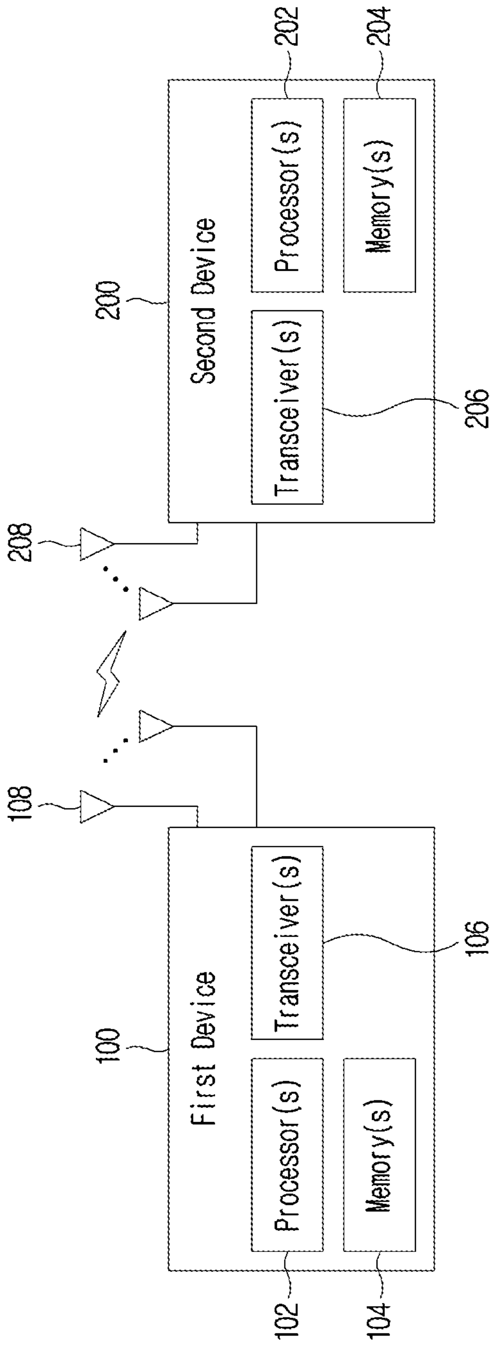
FIG. 14 is a diagram which illustrates a block diagram of a wireless communication device according to an embodiment of the present disclosure.

FIG. 14 illustrates a block diagram of a wireless communication device according to an embodiment of the present disclosure.

In reference to FIG. 14, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IOT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a terminal in a wireless communication system, the method comprising:

receiving, from a network, configuration information related to a first preamble group for a first type feature;

transmitting, to the network, a first message based on a preamble selected from the first preamble group; and transmitting, to the network, a second message including a logical channel identifier (LCID) related to a second type feature, wherein the terminal supports the first type feature and the second type feature, wherein the first type feature is Msg3 repetitions and is distinguished from the second type feature, and wherein the second type feature is a reduced capability (RedCap).

2. The method according to claim 1, wherein:

the LCID is related to a common control channel (CCCH) for the second type feature.

3. The method according to claim 1, wherein:

the second message corresponds to Msg3 transmitted based on a random access response.

4. The method according to claim 3, wherein:

the random access response corresponds to a fallback random access response of a 2-step random access procedure.

5. The method according to claim 1, wherein:

the second message is included in MsgA of a 2-step random access procedure.

6. The method according to claim 1, wherein:

based on a 4-step random access procedure being performed after reaching a maximum number of transmissions of MsgA in a 2-step random access procedure, a preamble selected from the first preamble group for the first type feature is transmitted.

7. A terminal in a wireless communication system, the terminal comprising:

at least one transceiver; and at least one processor connected to the at least one transceiver, wherein the at least one processor is configured to:

receive, through the at least one transceiver, from a network, configuration information related to a first preamble group for a first type feature;

transmit, through the at least one transceiver, to the network, a first message based on a preamble selected from the first preamble group; and transmit, through the at least one transceiver, to the network, a second message including a logical channel identifier (LCID) related to a second type feature, wherein the terminal supports the first type feature and the second type feature, wherein the first type feature is Msg3 repetitions and is distinguished from the second type feature, and wherein the second type feature is a reduced capability (RedCap).

8. A base station in a wireless communication system, the base station comprising:

at least one transceiver; and at least one processor connected to the at least one transceiver, wherein the at least one processor is configured to:

transmit, through the at least one transceiver, to at least one terminal, configuration information related to a first preamble group for a first type feature;

receive, through the at least one transceiver, from a specific terminal of the at least one terminal, a first message based on a preamble selected from the first preamble group; and receive, through the at least one transceiver, from the specific terminal, a second message including a logical channel identifier (LCID) related to a second type feature, wherein the specific terminal supports the first type feature and the second type feature, wherein the first type feature is Msg3 repetitions and is distinguished from the second type feature, and wherein the second type feature is a reduced capability (RedCap).

* * * * *